Figure 1:
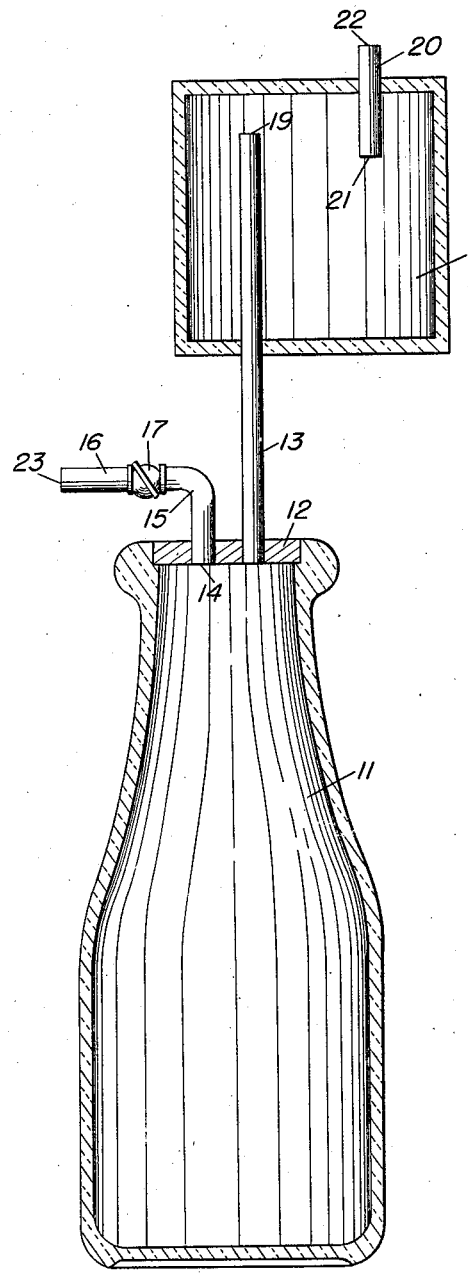

Sept. 1, 1942.    H. A. EINSTEIN    2,294,655
APPARATUS FOR SAMPLING LIQUID
Filed May 11, 1942    2 Sheets-Sheet 1

Inventor
H. A. Einstein
By
Attorneys

Patented Sept. 1, 1942

2,294,655

UNITED STATES PATENT OFFICE 2,294,655

APPARATUS FOR SAMPLING LIQUID

Hans Albert Einstein, Greenville, S. C., assignor to Claude R. Wickard, as Secretary of Agriculture of the United States of America, and his successors in office Application May 11, 1942, Serial No. 442,554

3 Claims. (Cl. 73—21)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to liquid sampling and more particularly to devices for use in taking samples from bodies of liquids, such devices being sometimes referred to as thieves.

In turbulent liquids the concentration of suspended or dissolved matter, such as sand, silt, organic matter, salts, gases, and so forth, changes locally with changes in the velocity of the liquid at a given point. If it is desired to obtain a sample of the liquid to determine the average concentration of such matter in a particular place, the sample should be collected over a period of time sufficiently long to insure the fact that it is truly representative. For this purpose, some sampling devices or thieves are provided with small openings for admitting the sample to prolong the time during which the sample will be collected. However, under a certain size these openings do not permit air to escape counter to the flow of the liquid into the container, and, consequently, an additional or secondary opening is provided for the escape of air initially present in the container. These two openings are generally arranged to provide, in operation, a statical or dynamical pressure difference to insure a steady flow of the liquid into the sampling device. A device provided with two of such openings, if used to obtain a sample of a liquid at a given depth below the surface, must have some means for preventing the device from receiving liquid from higher levels as it is lowered into position. If no valves are provided for these openings, liquid of undesirable origin will enter before the device is placed in proper position. If valves are provided for both of the openings, a full static pressure will operate against both of them, which is undesirable.

To obviate these difficulties, this invention comprises the provision of such a device with only one valve, this valve being in the liquid inlet and, instead of a second valve on the air escape opening, a chamber is provided, as hereinafter more fully explained.

In order to explain more fully this invention, two embodiments of it are illustrated in the accompanying drawings, and, considered together with the following description, a full and complete understanding of this invention may be had by those skilled in the art.

Figure 2:
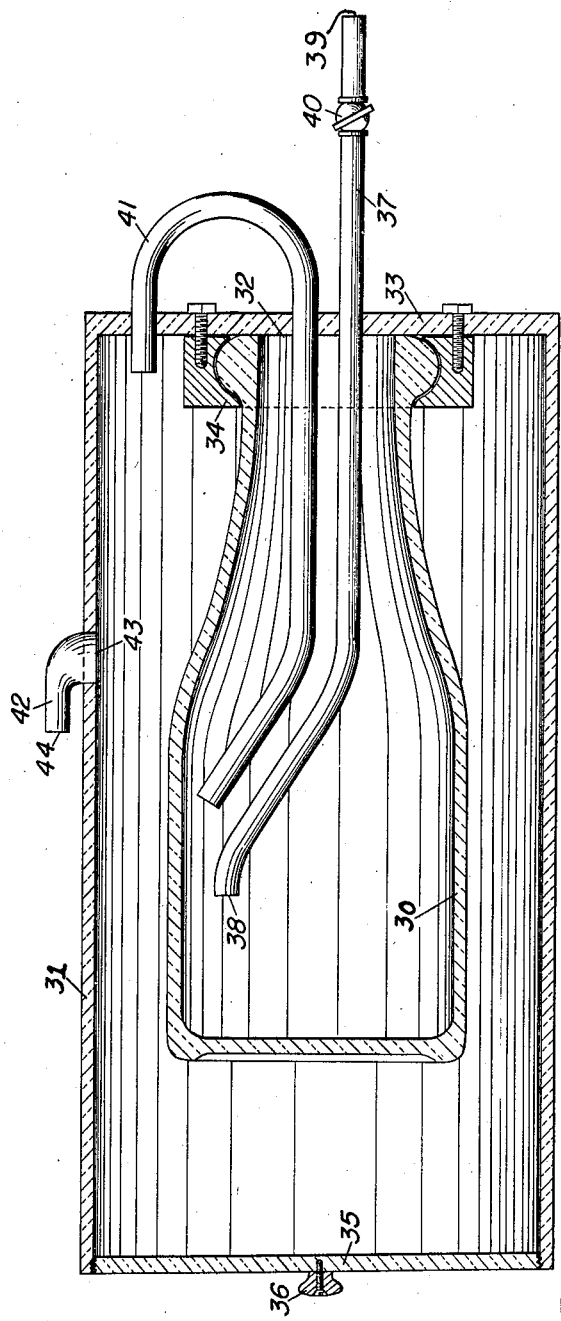

In the drawings:

Figure 1 is a sectional view of one embodiment of the invention, and Figure 2 is a sectional view of another embodiment of this invention.

The embodiment illustrated in Figure 1 is especially adapted for use in sampling static liquids and the embodiment in Figure 2 for liquids in motion.

Referring with more particularity to Figure 1, the embodiment illustrated comprises a container 11 having a liquid capacity equivalent to the quantity of sample desired. The container is provided with a removable liquid-tight cap 12, through which there is disposed the lower end of a long tube 13 and the vertical arm of an elbow tube 15. The horizontal arm 16 of the tube 15 is provided with a valve 17. The upper end of the tube 13 passes through the bottom of a chamber 18 to a point 19 just below the top. Another tube 20 is disposed through the top of the chamber 18 and projects downward to a point 21 just below the top of the tube 13.

To use this device, the valve 17 is closed with both the container 11 and the chamber 18 empty of liquid. The apparatus is then lowered into the body of liquid to be sampled. As it descends, pressure of the liquid against the valve 17 increases due to the increase in the hydrostatic head of the liquid on the outside, while the pressure within the container remains constant at atmospheric pressure until the upper end 22 of the tube 20 is submerged and liquid flows into the chamber 18 through said tube 20. The apparatus is brought to rest with the outer opening 23 of the tube 15 at the level where the sample is to be taken. Liquid continues to flow into the chamber 18 through the tube 20, which increases the pressure in the container 11 until it is equal to the hydrostatic pressure of the liquid at the level of the lower end 21 of the tube 20, thereby establishing an equilibrium. The volume of the chamber 18 is chosen such that, when this equilibrium is established, the level of the liquid inside the chamber 18 will be below the point 21, as well as below the top of the tube 13. At this point in the procedure there is a pressure against one side of the valve 17 corresponding to the hydrostatic pressure of the body of liquid at the level of the opening 23 and on the other side of the valve a smaller pressure corresponding to the hydrostatic pressure of the body of liquid at the level of the point 21. Under these conditions, the tube 20 will contain a column of liquid. The valve 17 is then opened, permitting liquid to enter the tube 15 under the force of the differential pressure at that point. This liquid falls into the container 11, and, as it fills the container, it displaces the air therein, which is forced upward through the tube 13 which forces the column of liquid in the tube 20 out through the top. When this condition obtains, the flow of liquid into the container 11 is under a pressure corresponding to the difference in hydrostatic heads between the lower end 14 of the tube 15 and the upper end 22 of the tube 20. Additional air displaced from the container 11 escapes through the tubes 13 and 20. When the container is filled, the valve 17 is closed and the entire apparatus lifted out of the liquid with the sample in the container 11.

Referring with more particularity to Figure 2, which illustrates an embodiment of this invention especially useful for sampling flowing bodies of water, the container for receiving the sample is designated by the numeral 30, and it is horizontally disposed in an ambient chamber 31. The mouth 32 of the container is removably attached to one of the end walls 33 of the chamber 31, by means of a bracket 34. This connection is air-tight. The container 30 is placed in and removed from the chamber 31 by unscrewing the opposite end wall 35 of the chamber. A knob 36 is secured to the wall 35 for the purpose of putting it in place and removing it. When in place, the end wall 35 seals the chamber 31 air-tight. Other means, however, may be provided for placing the container in and removing it from the chamber, the means illustrated and described above being merely suggestive. A tube 37 is disposed through the end wall 33 and projects through the mouth of the container 30, terminating at a point 38 near the rear and top of said container. The other end of the tube 37 on the outside projects forward with the terminal opening 39 facing the front. This tube is provided with a valve 40. One end of another tube 41 is also disposed through the end wall 33 and mouth 32, terminating also at a point near the top of said container. The other end of the tube 41 is bent backward and passes through the end wall 33 at a point above the mouth 32, so as to communicate with the space between the container 30 and the chamber 31. At the top of the chamber an elbow tube 42 is provided, one arm 43 of which is vertical and disposed through the wall of the chamber and the other arm 44 projecting horizontally toward the rear. In this embodiment hydrodynamic pressure is used to augment the hydrostatic pressure, and, consequently, it is not necessary for the hydrostatic pressure differential to be as great as in the first embodiment. In using this embodiment, the apparatus is submerged in the flowing liquid with the opening of the arm 44 facing down-stream and the opening of the forward end of the tube 37 facing up-stream. This creates a potential hydrodynamic pressure between these two points, which is additive to the hydrostatic pressure. As in the case of the first embodiment, liquid will enter the chamber 31 through the elbow pipe 42 until the pressures are equalized, thereby developing a resultant pressure against the valve 40 corresponding to the difference in pressures between the lower end of the elbow arm 42 and the opening at the forward end of the tube 37. Then the valve 40 is opened, permitting the liquid to flow into the container 30 through the pipe 37. The displaced air in the container 30 forces the liquid out of the tube 42 and establishes a differential pressure which remains constant due to the escape of air as the container is filled with a sample of the liquid.

In those cases where the velocity of the flowing liquid around the apparatus is constant during the period of filling, both the hydrostatic and the hydrodynamic pressure differentials will remain constant and, therefore, the amount of liquid flowing in the container will be proportional to time. Thus, the rate at which the liquid enters the container will be a function of the stream velocity of the body of liquid. Consequently, the apparatus may be calibrated for measuring stream velocities. This makes it possible to obtain two results with this apparatus simultaneously, namely, a sample of a flowing liquid and a measurement of its velocity at the same place with only one operation.

Having thus described my invention, I claim:

1. A liquid sampling apparatus comprising a container for receiving a liquid sample, a chamber, a tube connecting said chamber and container, a second tube communicating said container with the exterior, a valve in said second tube, and a third tube connecting said chamber with the exterior, the exterior opening of said second tube being normally below the exterior opening of said third tube.

2. A liquid sampling apparatus comprising a container for receiving a liquid sample, a chamber normally disposed above said container, a tube communicating with said container and chamber, said tube extending a substantial distance vertically through said chamber, a second tube communicating with said container for admitting a sample of ambient liquid, a valve in said second tube, and a third tube through a wall of said chamber, said third tube extending within said chamber to a point below said first tube.

3. A liquid sampling apparatus comprising a chamber, a container for receiving a sample of liquid, said container being secured within said chamber in spaced relation, a tube extending from the interior of said container to the exterior of said chamber, a valve in said tube, a second tube connecting the interior of said container with the space between said container and chamber, and a third tube through the top of said chamber, the exterior opening thereof facing in the direction opposite that of the first tube.

HANS ALBERT EINSTEIN.